Figure 1:
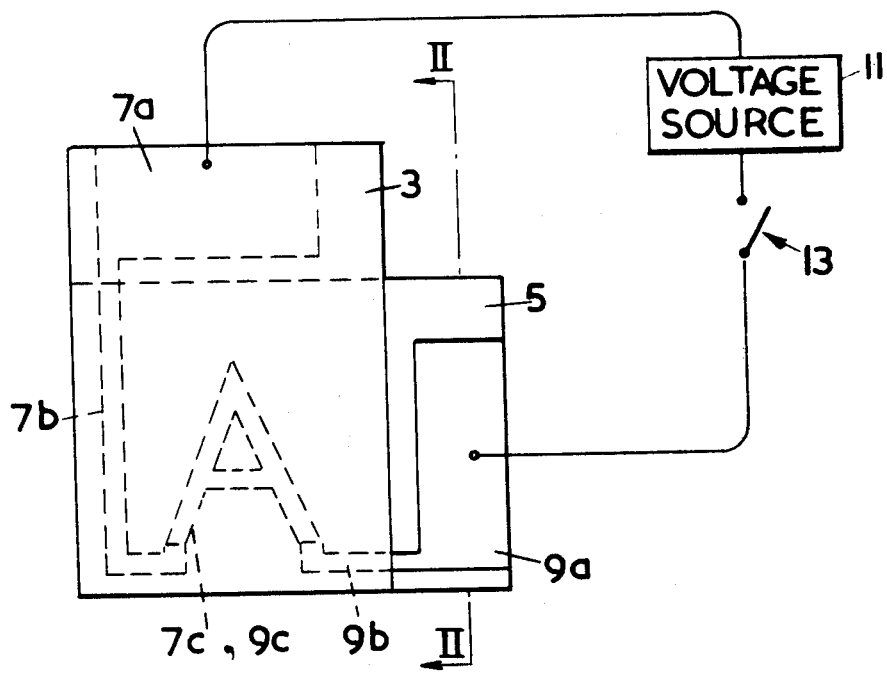

United States Patent [19]

Coates et al.

[11] 4,145,114

[45] Mar. 20, 1979

[54] PLEOCHROIC DYES

[75] Inventors: David Coates, Hessle; George W. Gray, Cottingham; Damien G. McDonnell, Hull, all of England

[73] Assignee: The Secretary of State for Defence in Her Britannic Majesty's Government of the United Kingdom of Great Britain and Northern Ireland, London, England

[21] Appl. No.: 695,404

[22] Filed: Jun. 14, 1976

[30] Foreign Application Priority Data

Jun. 17, 1975 [GB] United Kingdom .............. 25843/75
Jun. 17, 1975 [GB] United Kingdom .............. 25859/75
Dec. 31, 1975 [GB] United Kingdom .............. 53397/75
Dec. 31, 1975 [GB] United Kingdom .............. 53398/75

[51] Int. Cl.$^2$ .................. C09K 3/34; G02F 1/13
[52] U.S. Cl. .................... 350/349; 252/299; 252/408; 260/143; 260/144; 260/156; 260/158; 260/166; 260/169; 260/186; 260/189; 260/190; 260/191; 260/194; 260/205; 260/206
[58] Field of Search .................. 252/299, 408; 350/160 LC, 349, 350

[56] References Cited

U.S. PATENT DOCUMENTS

| | | | |
|---|---|---|---|
| 2,659,719 | 11/1953 | Dickey et al. .............. | 260/158 |
| 3,597,044 | 8/1971 | Castellano .............. | 252/299 |
| 3,703,329 | 11/1972 | Castellano .............. | 252/299 |
| 3,833,287 | 9/1974 | Taylor et al. .............. | 252/299 |
| 3,864,022 | 2/1975 | Moriyama et al. .............. | 252/299 |
| 3,947,375 | 3/1976 | Gray et al. .............. | 252/299 |
| 3,954,653 | 5/1976 | Yamazaki .............. | 252/299 |
| 3,960,750 | 6/1976 | Moriyama et al. .............. | 252/299 |
| 3,960,751 | 6/1976 | Moriyama et al. .............. | 252/299 |
| 3,974,087 | 8/1976 | Gray et al. .............. | 252/299 |
| 3,977,767 | 8/1976 | Okuma et al. .............. | 252/299 |
| 3,989,639 | 11/1976 | Yaguchi et al. .............. | 252/299 |
| 4,027,950 | 6/1977 | Moriyama et al. .............. | 252/299 |
| 4,029,392 | 6/1977 | Moriyama et al. .............. | 252/299 |
| 4,032,219 | 6/1977 | Constant et al. .............. | 252/299 |

FOREIGN PATENT DOCUMENTS

4731883 11/1972 Japan .................. 252/299
1459046 12/1976 United Kingdom .................. 252/299

OTHER PUBLICATIONS

White, D. L. et al., J. Appl. Phys., vol. 45, No. 11, pp. 4718–4723 (1974).
Blinov, L. M. et al., J. Physique (Paris), vol. 36, C1, No. 3, pp. 69–76 (Mar. 1975).
Gray, et al., Electronic Lett., vol. 9, No. 26, pp. 616–617 (1973).
Bloom, A. et al., Mol. Cryst. Liq. Cryst., vol. 40, pp. 213–221 (1977).
Uchida, T. et al., Mol. Cryst. Liq. Cryst., vol. 34 (Lett), pp. 153–158 (1977).

Primary Examiner—Benjamin R. Padgett
Assistant Examiner—T. S. Gron
Attorney, Agent, or Firm—Stevens, Davis, Miller & Mosher

[57] ABSTRACT

A dye compound suitable for use in solution with a liquid crystal material is characterized by one of the following formulae:

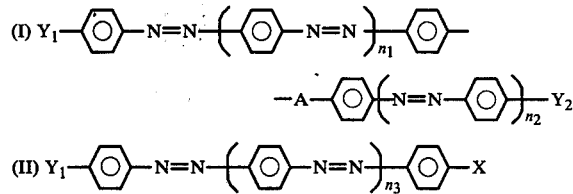

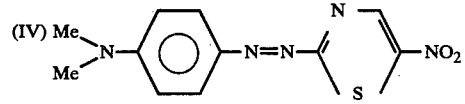

(III) a derivative of (I) or (II) containing one or more simple lateral substituents or bridging groups on the benzene rings:

(IV) Me$_2$N—⟨benzene⟩—N=N—⟨thiazole⟩—NO$_2$ where $n_1$, $n_2$, $n_3$ are integers in the range 0 to 4, A is azo or azoxy, X is cyano, or nitro and $Y_1$ and $Y_2$ are one of the following: hydrogen, alkoxy, arylalkoxy or $N_{R_2}R_1$ where $R_1$ and $R_2$ are alkyl, substituted alkyl or alkylene groups.

11 Claims, 2 Drawing Figures

PLEOCHROIC DYES

The present invention relates to solutions of pleochroic dye in liquid crystal material and liquid crystal devices incorporating such solutions.

These devices are known in the liquid crystal art as 'guest-host' devices and are used to provide a switched display, eg of alphanumeric digits. The molecular orientation of the dye arranges itself to follow that of the liquid crystal material. The liquid crystal molecular orientation can be changed from an 'off' state to an 'on' state by applying an external stimulus, normally an electric field, and consequently the colour strength of the dye can be changed between the 'off' and 'on' states.

A large number of dyes are known in the prior art but only a small number are suitable for use with liquid crystal materals in 'guest-host' devices. This is because a large proportion of known dyes are ionic and will not dissolve in liquid crystal material. Of those dyes which will dissolve only a small number are pleochroic. In other words only a small number absorb a colour component of white light to a degree which is dependent on the component of the electric vector of the light along a long molecular axis of the dye.

For maximum contrast between the 'on' and 'off' states in a guest-host device the pleochroic dye should ideally show a string colouration in one state and no colouration at all, ie it should be transparent, in the other state. Unfortunately the contrasts obtained in practice are relatively poor. The reason for this is as follows.

In order to give maximum colouration the pleochroic dye molecules need to be arranged with their long axes perpendicular to the propagation direction of incident white light and, preferably parallel to the electric vector of the light. In order to give minimum colouration, ie transparency, the dye molecules need to be arranged with their long axes parallel to the light propagation direction. The light propagation direction is normally determined by the device construction geometry. The direction is normally fixed perpendicular to a pair of electrodes, ie along the direction in which an electric field is applied. The liquid crystal and dye molecules on the other hand undergo random thermal fluctuations in orientation and, even with an electric field applied, can never be made to lie exactly perpendicular or parallel to the light propagation direction over a period of time. The degree to which the orientation of the molecules fluctuate is measured by a quantity known as the order parameter S which is given by the following equation:

$$S = \frac{\overline{(3\cos^2\theta - 1)}}{2}$$

where the $\cos^2\theta$ term is time averaged and where $\theta$ is the angular orientation of the molecules with respect to a reference orientation representing perfect alignment of the molecules.

Virtually none of the small number of pleochroic dyes which has been used in the prior art in solution with liquid crystal material in a guest-host device has a satisfactorily high order parameter S and a suitable chemical stability.

According to one aspect of the present invention a dye compound suitable for use in solution with a liquid crystal material is characterised by one of the following formulae:

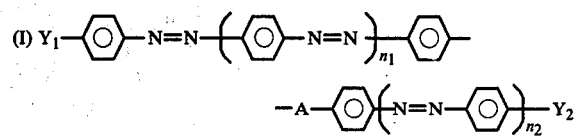

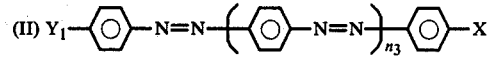

(III) a substituted derivative of formula (I) or formula (II) in which any one of the positions on any one of the benzene rings is substituted by one of the following groups:
 (i) halogen
 (ii) methyl
 (iii) halogen substituted methyl (eg $CF_3$)
 (iv) methoxy;

(IV) a substituted derivative of formula (I) or formula (II) in which any two adjacent positions on any one of the benzene rings is bridged by a fused aromatic ring forming a naphthalene structure.

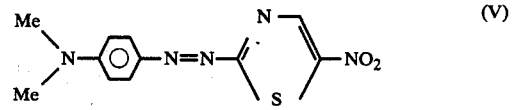

wherein:
A is an azo or azoxy linkage group;
$n_1$, $n_2$ and $n_3$ are each integers in the inclusive range 0 to 4;
$Y_1$, $Y_2$ are each one of the following groups:
(i) hydrogen
(ii) $OR_3$ where $R_3$ is an alkyl or arylalkyl group
(iii)

where $R_2$ and $R_1$ are each one of the following: an alkyl group, a substituted alkyl group or an alkylene group forming a reduced heteroaromatic system with the terminal aromatic ring.
X is a nitro or cyano group.

This dye compound and a solution of the dye in liquid crystal material will be referred to herein as a dye and solution 'as defined'.

Preferably $n_1 = n_2$ or $n_1 + 1 = n_2$.

The elongated structure of the molecules of the dyes as defined above is specially chosen in order to give enhanced order parameters, and the end groups Y are specially chosen in order to give enhanced pleochroic colour absorption and to give reasonable solubility in liquid crystal materials.

Preferably the liquid crystal material in which the dye is dissolved includes one of the compounds described in copending United Kingdom Patent Specification No. 1,433,130, particularly a compound having the formula

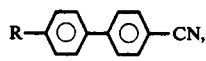

where R is an alkyl or alkoxy group.

According to another aspect of the invention a liquid crystal device includes a solution as defined above, and means for applying a stimulus to the solution to vary the orientation of the molecules in the solution.

The means for applying a stimulus preferably comprises electrodes for applying an electric field, the electrodes being deposited in a conventional way on the inner surfaces of transparent substrates between which the solution is encapsulated. The electrodes may be in the shape of display characters or digits.

The pleochroic dyes as defined above may be prepared by methods whose general form is known. The following preparation Examples illustrate the use of such methods.

EXAMPLE 1

Preparation of dyes of formula (I) as defined above, where $n_1 = 0$, $n_2 = 1$ and $Y_1, Y_2 = NR_2R_3$, by the following routes:

Step B1

The production of dyes having three azo linkages.

One example of a way of carrying out this step is as follows.

The product of Step A1 (4-nitro-4'-N N-dialkylaminoazobenzene (0.03 mole) is dissolved in a minimum volume of sodium dried tetrahydrofuran and the solution added in drops to a solution of lithium aluminum hydride (0.06 mole) in dry tetrahydrofuran (10 ml). The reaction mixture is protected from moisture by calcium chloride filled tubes.

The reaction mixture is stirred, and after addition is complete, is warmed to about 60° C. The progress of the reaction is then monitored using thin layer chromatography, and when all the starting material has reacted (normally after about 1 hour), the reaction mixture is cooled. Unreacted lithium aluminum hydride is cautiously destroyed with water, and the mixture is filtered. The solid residue is purified by column chromatography using silicic acid and chloroform as eluent. The pure product is then crystallised from a suitable solvent, such as pyridine, methanol or nitrobenzene.

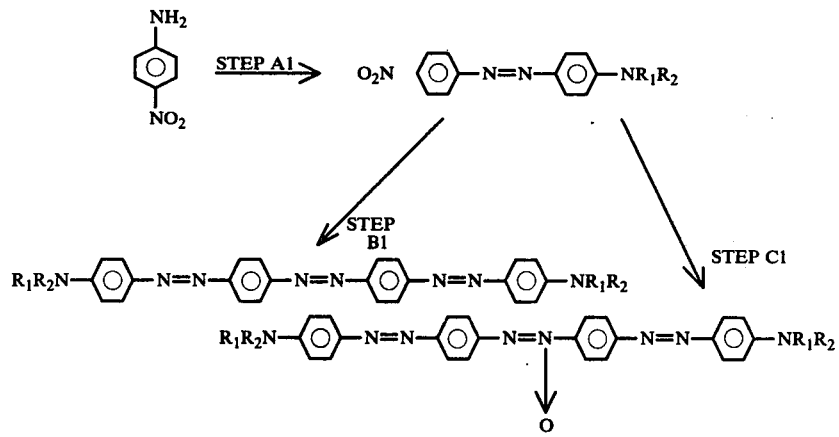

Step A1

The production of 4-nitro-4'-N,N-dialkylaminoazobenzenes.

One example of a way of carrying out this step is as follows 4-nitroaniline (1 mole) is diazotised by a conventional method using nitrous acid. A solution of an N,N-dialkylaniline (1 mole) (either commercially available or preparable by standard methods) in glacial acetic acid is added at a temperature below 5° C and the solution is well stirred for about 2 hours, the pH of the solution being adjusted to pH 5 to 6 by the addition of sodium acetate solution. The pH of the solution is then adjusted to pH7 using sodium hydroxide solution, and the reaction product which is a solid is filtered off and washed with water and water/ethanol. The solid is oven dried and crystallised from methanol or some other suitable solvent.

Step C1

The production of dyes having two azo linkages and a central azoxy linkage.

One example of a way of carrying out this step is as follows:

The product of Step A1 (0.1 mole) is dissolved in a minimum volume of hot ethanol. Potassium borohydride (0.8 mole) is made into a slurry with ethanol and is then added in one portion to the ethanolic solution of the product of Step A1. The solution is stirred during the addition. The solution is made alkaline by the addition of sodium hydroxide pellets and is then stirred and heated under reflux for about 24 hours. After cooling the reaction mixture the product is filtered off and is purified by column chromatography using silicic acid and chloroform as eluent. The product may be crystallised in the same way as described in Step B1.

EXAMPLE 2:

Preparation of dyes of formula (I) as described above, where $n_1 = 0$; $n_2 = 1$ and $Y_1, Y_2 =$ alkoxy $(OR_1)$ by the following routes:

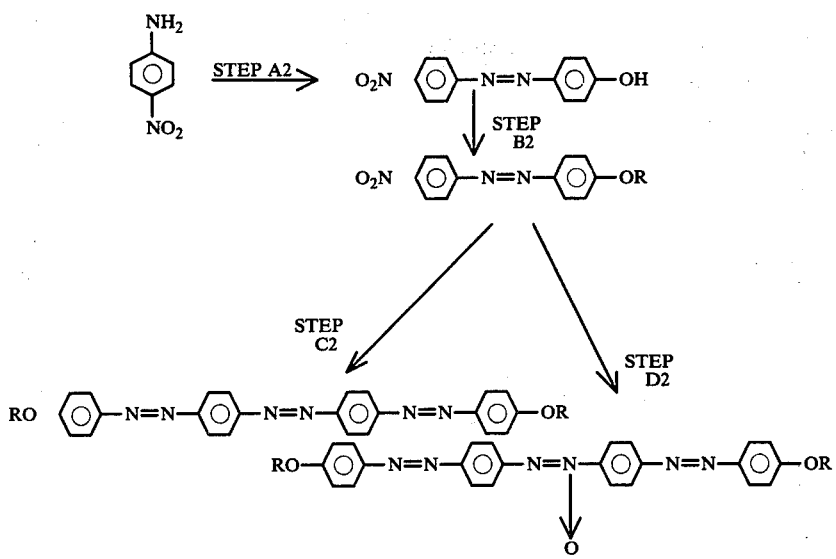

Step A2

The production of 4-nitro-4'-hydroxyazobenzenes

One example of a way of carrying out this step is as follows:

4-nitroaniline (1 mole) is diazotised by a conventional method using nitrous acid. The diazonium salt solution which results is then added in drops to a solution of phenol (1 mole) dissolved in a strongly alkaline solution of sodium hydroxide at 0. °C. After addition is complete, the reaction mixture is acidified with concentrated hydrochloric acid and the solid product is filtered off by a pump, well washed with water, and oven dried.

Step B2

The production of 4-nitro-4'-alkoxyazobenzenes

One example of a way of carrying out this step is as follows.

4-nitro-4'-alkoxyazobenzene (0.02 mole), anhydrous potassium carbonate (0.08 mole), a bromoalkane (commercially available) (0.03 mole) and butan-2-one (300 ml) are all mixed, stirred and heated together under reflux for about 48 hours. On cooling, the reaction mixture is poured into a large volume of water and shaken with chloroform (200 ml). The chloroform layer is dried over anhydrous sodium sulphate and evaporated to dryness. The crude product is purified by crystallisation from methanol or other suitable solvent.

Steps C2 and D2

Step C2 is carried out in a manner analogous to step B1 above and Step D2 is carried out separately in a manner analogous to step C1 above.

EXAMPLE 3:

Preparation of dyes of formula (I) as defined above, where $n_1 = 1$; $n_2 = 2$ and $Y_1;Y_2 = Y$ where Y is a substituent other than hydrogen, by the following routes:

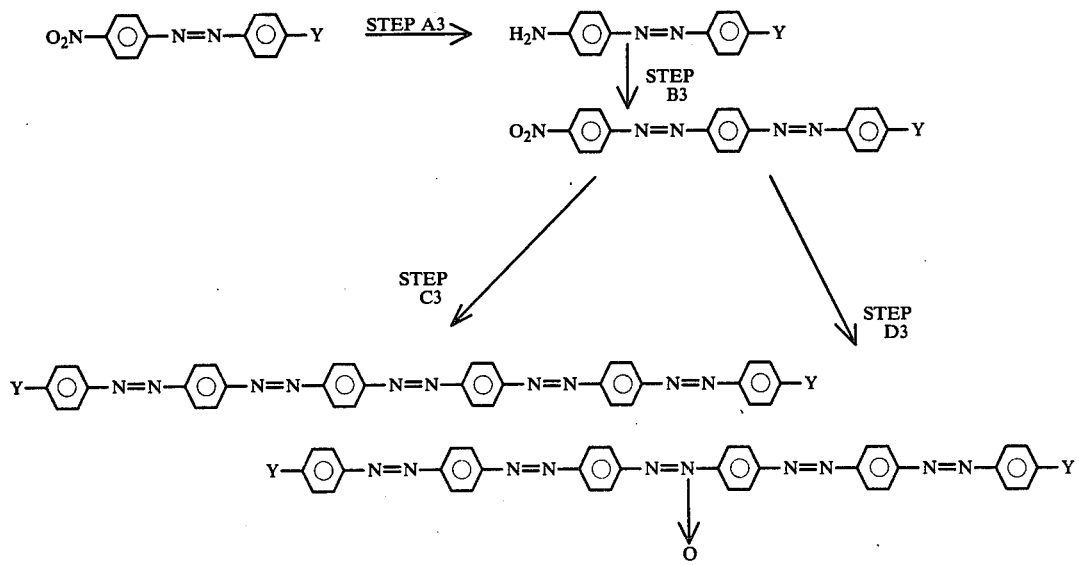

Step A3

The production of 4-amino-4'-Y-azobenzenes.

One example of a way of carrying out this step is as follows:

The product from Step A1 or B2 (4-nitro-4'-alkoxyor 4'-N,N-dialkylaminoazobenzene) (0.2 mole) is mixed with ethanol (200 ml) and heated under reflux for 1½ hours with a solution of 20% sodium hydrosulfide (14 ml); the preparation of the latter compound is given in *J. Chem. Soc*, 242, (1948). The reaction mixture is then cooled, evaporated to small bulk and poured into water; the precipitated solid is filtered off and crystallised from water/ethanol.

Step B3

The production of nitro-compounds with two azo-linkages

One example of a way of carrying out this step is as follows:

The product of Step A3 (1 mole) is dissolved in a minimum volume of warm glacial acetic acid and a solution of 4-nitrosonitrobenzene (1 mole) in warm glacial acetic acid is added. The mixture is allowed to stand for 1 to 2 days. The product is filtered off, washed with water and oven dried. The product is purified by column chromatography using silicic acid and chloroform as eluent.

Steps C3 and D3

Step C3 is carried out in a manner analogous to Step B1 above. Step D3 is carried out separately in a manner analogous to Step C1 above.

EXAMPLE 4

Preparation of dyes of formula (I) as defined above, where $Y_1, Y_2 = Y$, and Y is a substituent other than hydrogen; $n_1 = 2$; and $n_2 = 3$; by the following routes:

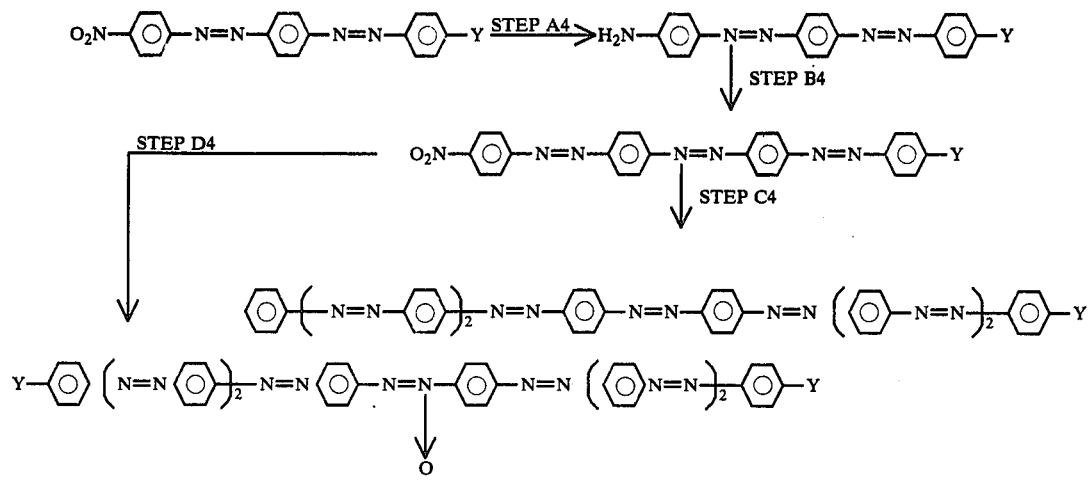

Step A4

The nitro compound produced by Step B3 is reduced to a corresponding amino compound by a method analogous to Step A3.

Step B4

The amino compound produced by Step A4 is condensed with 4-nitrosonitrobenzene by a method analogous to step B3 to provide the nitro-dye which may be used as a dye itself or as the starting material for Steps C4 and D4.

Step C4

This step is carried out in a manner analogous to Step B1 above.

Step D4

This step is carried out in a manner analogous to Step C1 above.

EXAMPLE 5

Preparation of dyes of formula (I) as defined above, where $n_1 = 3$, $n_2 = 4$ and $Y_1, Y_2 = Y$, and Y is a substituent other than hyrogen, by the following routes:

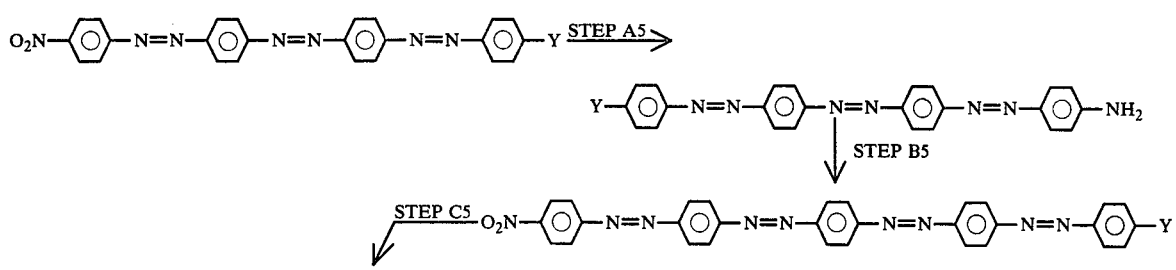

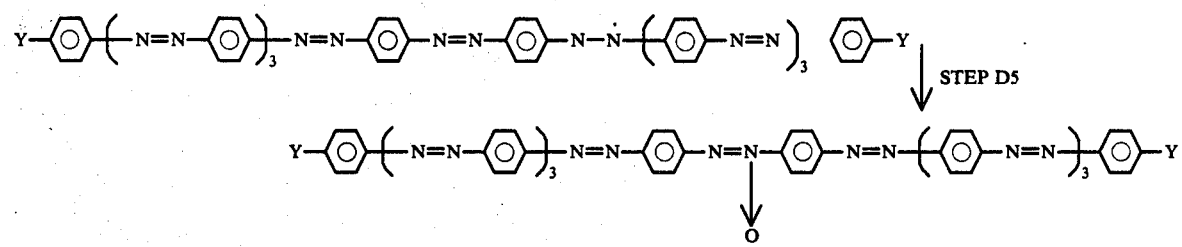

Step A5

The nitro compound produced by Step B4 is reduced to the corresponding amino compound by a method analogous to Step A3.

Step B5

The amino compound produced by Step A5 is condensed with 4-nitrosonitrobenzene by a method analogous to Step B3 to provide a nitro-compound with 5 benzene rings which may be used as a dye itself or as the starting material for Steps C5 and D5.

Step C5

This step is carried out in a manner analogous to Step B1.

Step D5

This step is carried out in a manner analogous to Step C1.

EXAMPLE 6

Preparation of dyes of formula (I) as defined above where $n_1 = 0$; $n_2 = 1$ and $Y_2 = Y_1 =$ Hydrogen by the following routes:

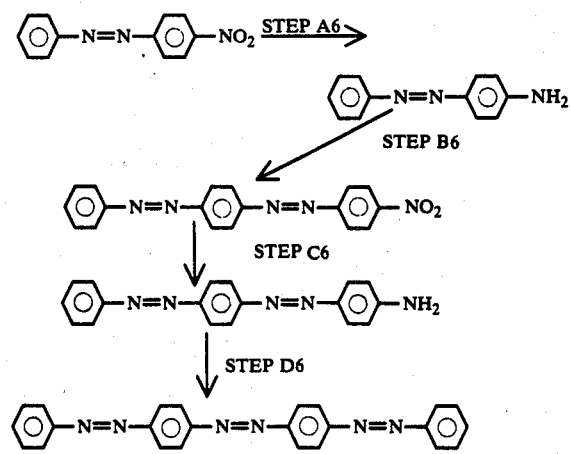

Step A6

The production of 4-aminoazobenzenes.

One example of a way of carrying out this step is as follows.

The starting material, 4-nitroazobenzene is prepared from aniline and 4-nitronitrosobenzene in a manner analogous to step B3. The product is then reduced to the corresponding amino compound in a manner analogous to Step A3.

Step B6

This condensation is carried out in a manner analogous to Step B3 using the product from Step A6 and 4-nitronitrosobenzene.

Step C6

This reduction step is carried out in a manner analogous to Step A3.

Step D6

The production of dyes having three azo linkages and no terminal substituent at one end: This step is carried out in a manner analogous to Step B3 but using nitrosobenzene.

EXAMPLE 7

The production of dyes of formula (I) as defined above where $n_1 = 1$; $n_2 = 2$ and $Y_1 = Y_2 =$ Hydrogen at both ends by the following routes:

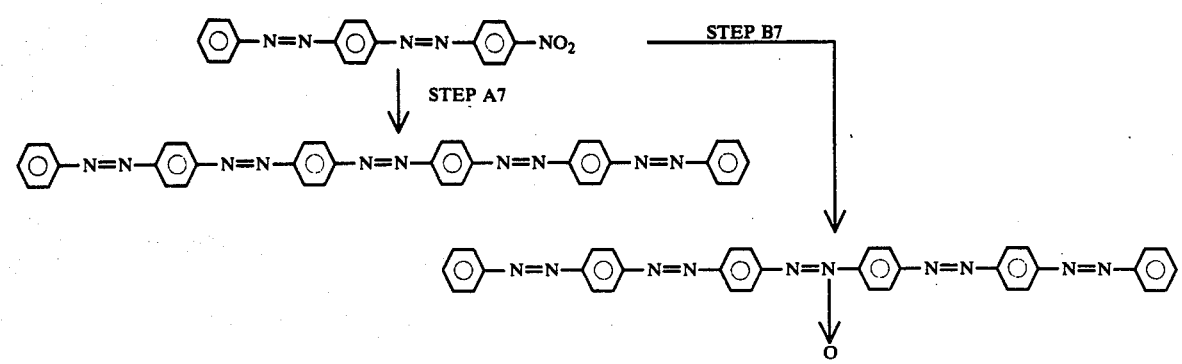

The starting material is prepared in a manner analogous to Steps B3 and A6.

Steps A7, and B7

These steps are carried out in an analogous way to steps B1 and C1 respectively.

EXAMPLE 8

The production of dyes as defined of formula (I) above where $n_1 = 2$, $n_2 = 3$ and $Y_1 = Y_2 =$ hydrogen, by the following routes:

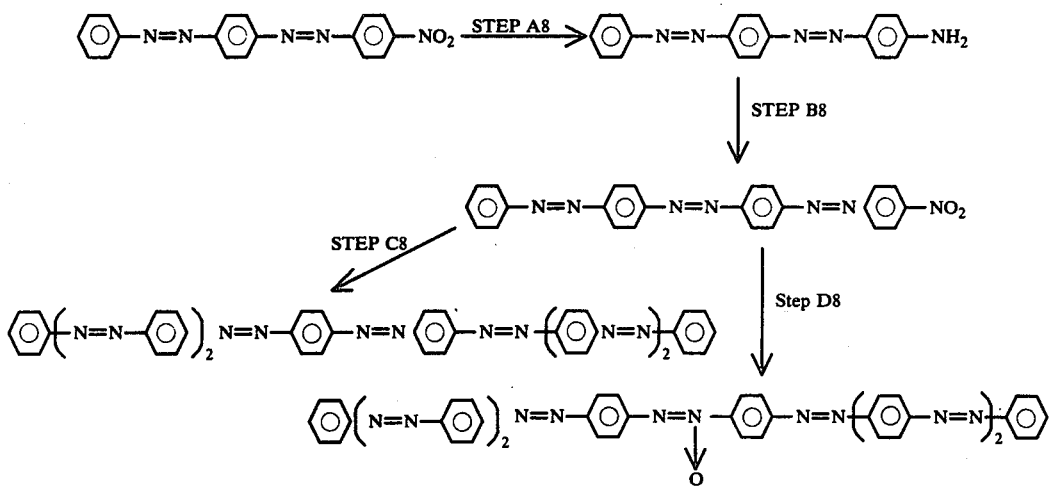

The starting material is prepared in a manner analogous to Steps A6 and B6.

Step A8

This step is carried out in an analogous way to Step A3.

Step B8

This step is carried out in an analogous way to Step B3. These nitro-dyes may be used as dyes or as starting materials for Steps C8 and D8.

Steps C8 and D8

These steps are carried out in an analogous way to steps B1 and C1, respectively.

EXAMPLE 9

The production of dyes of formula (I) as defined above where $n_1 = 3$, $n_2 = 4$ and $Y_1 = Y_2 =$ hydrogen by the following routes:

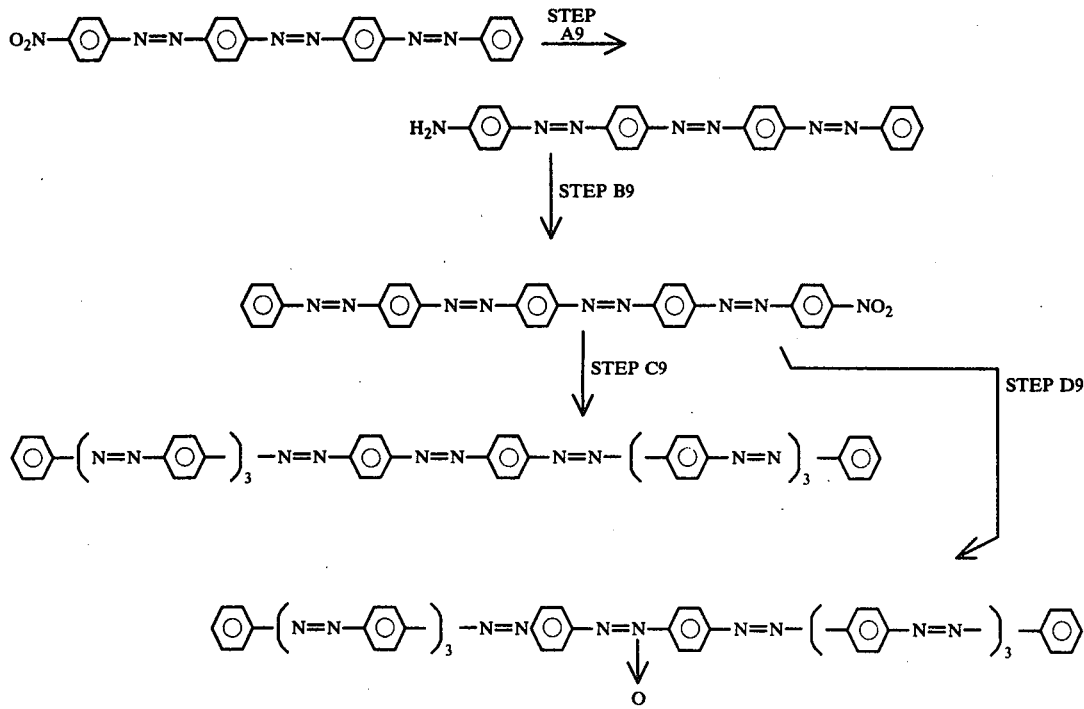

The starting material is prepared in a manner analogous to Steps A8 and B8.

Step A9

This step is carried out in an analogous way to Step A3.

Step B9

This step is carried out in an analogous way to Step B3. These nitro-dyes may be used either as dyes or as starting materials for Steps C9 and D9.

Steps C9 and D9

These steps are carried out in an analogous way to Steps B1 and C1, respectively.

EXAMPLE 10

The production of dyes of formula (I) as defined above where $n_1 = n_2 = 0$; $Y_1 =$ hydrogen; $Y_2 = NR_1R_2$ as defined above, by the following route:

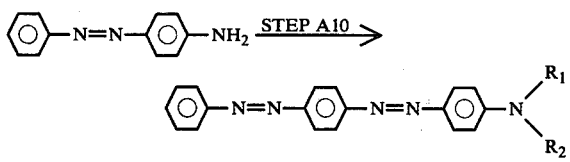

Step A10

4-Aminoazobenzene, which is a well known and commercially available compound, (1 mol) is diazotised by a conventional method using nitrous acid. A solution of N, N-dialkylaniline (1 mol) in glacial acetic acid is added at 0°-5° C. and the solution stirred for about 2 hours, the pH of the solution being adjusted to pH 5 to 6 by the addition of sodium acetate solution. The pH of the solution is then adjusted to pH 7 using sodium hydroxide solution and the reaction product is filtered off and washed with water and oven dried. Column chromatography on aluminum oxide using dichloromethane as eluent is used to purify the dye.

It will be apparent to those versed in the arts and science of organic chemistry that dyes as defined in formula (III and IV) above which have an even number of azo linkages (excluding the linkage A as defined above) and which are substituted versions of the compounds prepared in Examples 1 to 9 may be prepared by suitable reduction, diazotisation and condensation steps analogous to those described in those Examples. For example additional substituents, such as halogen, simple alkyl, simple substituted alkyl, simple alkoxy, or bridging groups such as a fused ring forming a naphthalene structure, may be introduced into the benzene rings of the dye structures defined by using appropriately substituted or bridged derivatives of the reagents used during the diazotisation and condensation stages, eg appropriate derivatives of nitroso-and nitronitrosobenzene.

It will also be apparent to those versed in organic chemistry that in the case of other asymmetrical dyes in formula (III) and (IV) as defined above, ie having an odd number of azo linkages (excluding the linkage A), which have at least one ring substituted or bridged the end group $Y_2$ may be introduced in a similar manner to Step A10, eg using a suitable reagent alternative to dialkylaniline.

EXAMPLE 11

Preparation of dyes as defined in formula (II) above, where $n_3 = 0$ and $Y_1 = NR_2R_1$, and X is nitro by the following route:

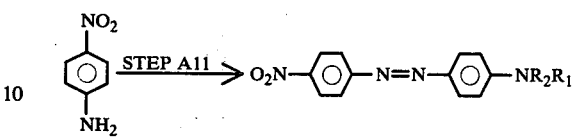

Step A11

The production of 4-nitro-4'-N,N-dialkylaminoazobenzenes.

One example of a way of carrying out this step is as follows. 4-nitroaniline (1 mole) is diazotised by a conventional method using nitrous acid. A solution of an N,N-dialkylaniline (1 mole) (either commercially available or preparable by standard methods) in glacial acetic acid is added at a temperature below 5°C. and the solution is well stirred for about 2 hours, the pH of the solution being adjusted to pH 5 to 6 by the addition of sodium acetate solution. The pH of the solution is then adjusted to pH7 using sodium hydroxide solution, and the reaction product which is a solid is filtered off and washed with water and water/ethanol. The solid is oven dried and crystallised from methanol or some other suitable solvent.

EXAMPLE 12

Preparation of dyes as defined in formula (II) above, where $n = 0$ and $Y =$ alkoxy (OR) and X is nitro by the following route:

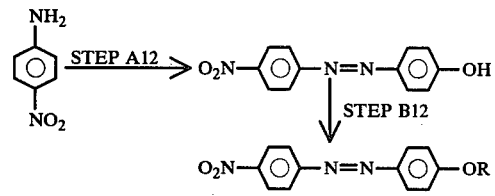

Step A12

The production of 4-nitro-4'-hydroxyazobenzenes:

One example of a way of carrying out this step is as follows:

4-nitroaniline (1 mole) is diazotised by a conventional method using nitrous acid. The diazonium salt solution which results is then added in drops to a solution of phenol (1 mole) dissolved in a strongly alkaline solution of sodium hydroxide at 0° C. After addition is complete, the reaction mixture is acidified with concentrated hydrochloric acid and the solid product is filtered off by a pump, well washed with water, and oven dried.

Step B12

The production of 4-nitro-4'-alkoxyazobenzenes: One example of a way of carrying out this step is as follows:

4-nitro-4'-hydroxyazobenzene (0.02 mole), anhydrous potassium carbonate (0.08 mole), a bromoalkane (commercially available) (0.03 mole) and butan-2-one (300 ml) are all mixed, stirred and heated together under reflux for about 48 hours. One cooling, the reaction mixture is poured into a large volume of water and shaken with chloroform (200 ml). The chloroform layer is dried over anhydrous sodium sulphate and evaporated to dryness. The crude product is purified by crystallisation from methanol or other suitable solvent.

EXAMPLE 13

Preparation of dyes as defined in formula (II) above, where $n = 1$ and Y is a substituent other than hydrogen and is nitro, by the following route:

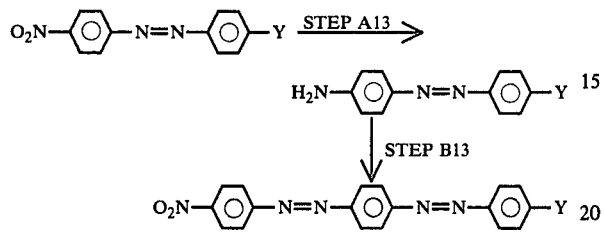

Step A13

The production of 4-amino-4'-Y-azobenzenes.

One example of a way of carrying out this step is as follows:

The product from Step A11 or B12(4-nitro-4'-alkoxy- or 4'-N,N-dialkyl-aminoazobenzene) (0.2 mole) is mixed with ethanol (200 ml) and heated under reflux for 1½ hours with a solution of 20% sodium hydrosulfide (14 ml); the preparation of the latter compound is given in *J. Chem, Soc,* 242 (1948). The reaction mixture is then filtered, evaporated to dryness, and the resultant solid is crystallised from water/ethanol.

Step B13

The production of nitro-compounds with two azo-linkages:

One example of a way of carrying out this step is as follows:

The product of Step A13 (1 mole) is dissolved in a minimum volume of warm glacial acetic acid and a solution of 4-nitrosonitrobenzene (1 mole) in warm glacial acetic acid is added. The mixture is allowed to stand for 1 to 2 days. The product is filtered off, washed with water and oven dried. The product is purified by column chromatography using alumina and dichloromethane as eluent.

EXAMPLE 14

Preparation of dyes as defined in formula (II) above, where Y is a substituent other than hydrogen and $n = 2$ and X is nitro, by the following route:

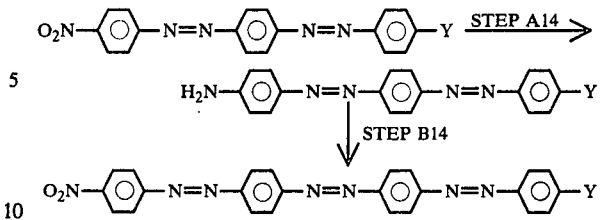

Step A14

The nitro compound produced by Step B13 is reduced to a corresponding amino compound by a method analogous to Step A13.

Step B14

The amino compound produced by Step A14 is condensed with 4-nitrosonitrobenzene by a method analogous to step B13 to provide the nitro-dye.

EXAMPLE 15

Preparation of dyes as defined in formula (II) above, where $n = 3$, and Y is a substituent other than hydrogen and X is nitro, by the following route:

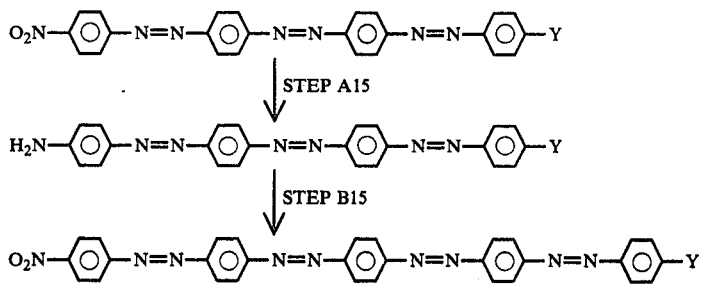

Step A15

The amino compound produced by Step A15 is condensed with 4-nitrosonitrobenzene by a method analogous to Step B13 to provide a nitro-compound with 5 benzene rings.

EXAMPLE 16

Preparation of dyes as defined in formula (II) above where $n_3 = 0$ and $n_3 = 1$ and $Y_1 =$ hydrogen and X is nitro by the following route:

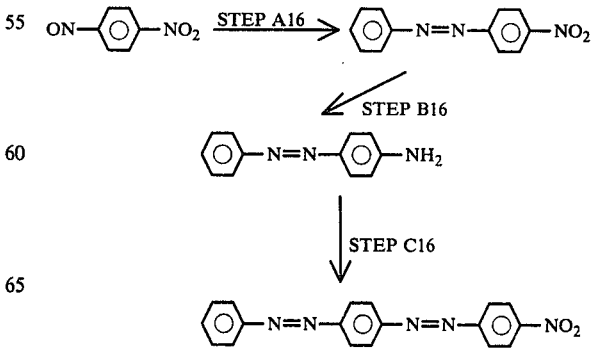

Step A16

This step is carried out in a manner analogous to Step B13 using aniline and 4-nitrosonitrobenzene. The 4-nitroazobenzene may be used as a dye itself or as a starting material for step B16.

Step B16

The 4-nitroazobenzene is reduced to 4-amioazobenzene in a manner analogous to Step A13.

Step C16: This condensation is carried out in a manner analogous to Step B13 using the product from Step B6 and 4-nitronitrosobenzene.

EXAMPLE 17

The production of dyes in formula (II) as defined above where $n_3 = 2$ and $Y_1 =$ hydrogen and X is nitro, by the following route:

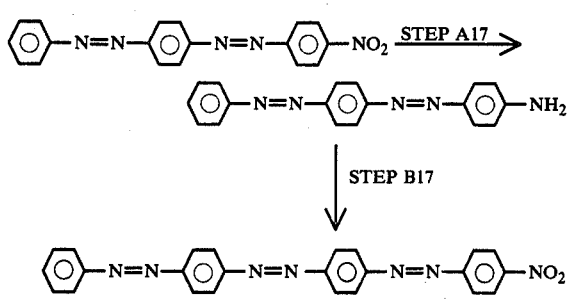

The starting material is the product of Example 16.

Step A17

This step is carried out in a manner analogous to Step A13.

Step B17

This step is carried out in a manner analogous to Step B13.

EXAMPLE 18

The production of dyes as defined in formula (II) above where $n_3 = 3$ and Y = hydrogen, X = nitro by the following routes:

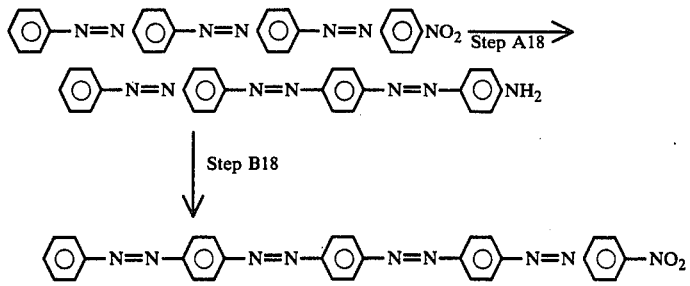

The starting material is the product of Example 17.

Step B18

This step is carried out in a manner analogous to Step B3.

It will be apparent to those versed in the arts and science of organic chemistry that dyes as defined in formula (III) and (IV) above and which are derivatives of those prepared in Examples 11 to 18 may be prepared by suitable reduction, diazotisation and condensation steps analogous to those described in the Examples. For example additional substituents, such as halogen, simple alkyl, simple substituted alkyl, simple alkoxy, or bridging groups such as a fused ring forming a napthalene structure, may be introduced into the benzene rings of the dye structures defined by using appropriately substituted or bridged derivatives of the reactants used during the diazotisation and condensation stages, eg appropriate derivatives of nitroso-and nitronitrosobenzene, and substituted nitro-amines and phenols.

EXAMPLE 20

Preparation of dyes as in formula (II) defined above, where X is CN, $n_3 = 0$ and $Y = NR_2R_1$, by the following route:

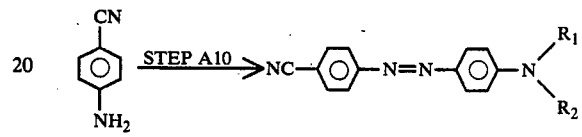

Step A20

The production of 4-cyano-4'-N,N dialkylaminoazobenzenes.

One example of a way of carrying out this step is as follows: 4-cyanoaniline (1 mole) is diazotized in a conventional way using nitrous acid. A solution of an N,N-dialkylaniline (1 mole) (either commercially available or preparable by standard methods) in glacial acetic acid is added at a temperature below 5° C., and the solution is well stirred for about 2 hours, the pH of the solution being adjusted to pH 5 to 6 by the addition of sodium acetate solution. The pH of the solution is then adjusted to pH7 using sodium hydroxide solution, and the reaction product which is a solid is filtered off and washed with water and water/ethanol. The solid is oven dried and crystallised from methanol or some other suitable solvent.

EXAMPLE 21

Preparation of modified dyes having the formula (II) defined above, where $n_3 = 0$ and Y = alkoxy (OR) and X is cyano by the following route:

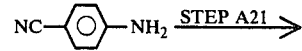

-continued

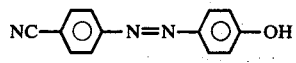

↓ STEP B21

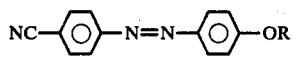

Step A21

The production of 4-cyano-4'-hydroxyazobenzenes:

One example of a way of carrying out this step is as follows: 4-cyanoaniline (1 mole) is diazotised by a conventional method using nitrous acid. The diazonium salt solution which results is then added in drops to a solution of phenol (1 mole) dissolved in a strongly alkaline solution of sodium hydroxide at 0° C. After addition is complete, the reaction mixture is acidified with concentrated hydrochloric acid and the solid product is filtered off by a pump, well washed with water, and oven dried.

Step B21

The production of 4-cyano-4'-alkoxyazobenzenes

One example of a way of carrying out this step is as follows: 4-cyano-4'-hydroxyazobenzene (0.02 mole), anhydrous potassium carbonate (0.08 mole), a bromoalkane (commercially available)(0.03 mole) and butan-2-one (300 ml) are all mixed, stirred and heated together under reflux for about 48 hours. On cooling, the reaction mixture is poured into a large volume of water and shaken with chloroform (200 ml). The chloroform layer is dried over anhydrous sodium sulphate and evaporated to dryness. The crude product is purified by crystallisation from methanol or other suitable solvent.

EXAMPLE 22

Preparation of dyes of formula (II) as defined above, where $n_3 = 1$ and Y is a substituent other than hydrogen and X is cyano, by the following route:

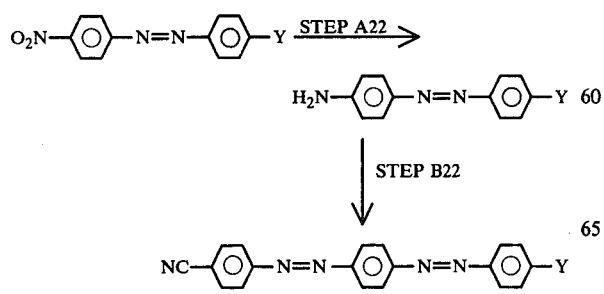

Step A22

The production of 4-amino-4'-Y-azobenzenes

One example of a way of carrying out this step is as follows:

4-nitro-4'-alkoxy- or 4'-N,N-dialkylaminoazobenzene (prepared by a method analogous to Step A10, but using 4-nitroaniline instead of 4-cyanoaniline) (0.2 mole) is mixed with ethanol (200 ml) and heated under reflux for 1½ hours with a solution of 20% sodium hydrosulfide (14 ml); the preparation of the latter compound is given in J. Chem, Soc, 242, (1948). The reaction mixture is then filtered, evaporated to dryness, and the resultant solid is crystallised from water/ethanol.

Step B22

The production of cyano-compounds with two azo-linkages

One example of a way of carrying out this step is as follows:

The product of Step A22 (1 mole) is dissolved in a minimum volume of warm glacial acetic acid and a solution of 4-nitrosocyanobenzene (1 mole) in warm glacial acetic acid is added. The mixture is allowed to stand for 1 to 2 days. The product is filtered off, washed with water and oven dried. The product is purified by column chromatography using alumina and dichloromethane as eluent.

EXAMPLE 23

Preparation of dyes of formula (II) as defined above, where Y is a substituent other than hydrogen and $n_3 = 2$ and X is cyano, by the following route:

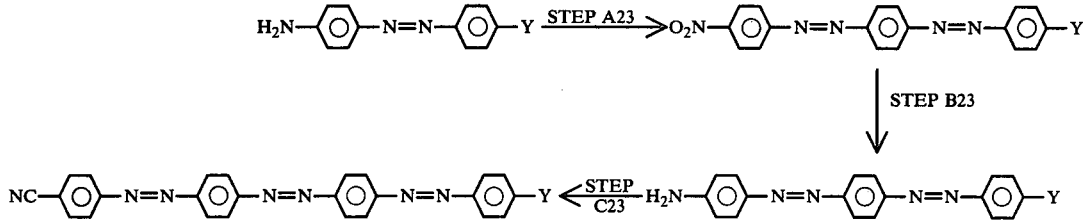

Step A23

The amino compound produced by Step A22 is condensed with 4-nitrosonitrobenzene by a method analogous to Step B22 to provide the nitro dye.

Step B23

The nitro compound produced by Step A23 is reduced to a corresponding amino-compound by a method analogous to Step A22.

Step C23

The product of Step B23 is condensed with 4-cyanonitrosobenzene by a method analogous to Step B22 to provide the cyano-dye.

EXAMPLE 24

Preparation of dyes of formula (II) as defined above where $n_3 = 0$ and $n_3 = 1$ and Y = hydrogen and X is cyano by the following route:

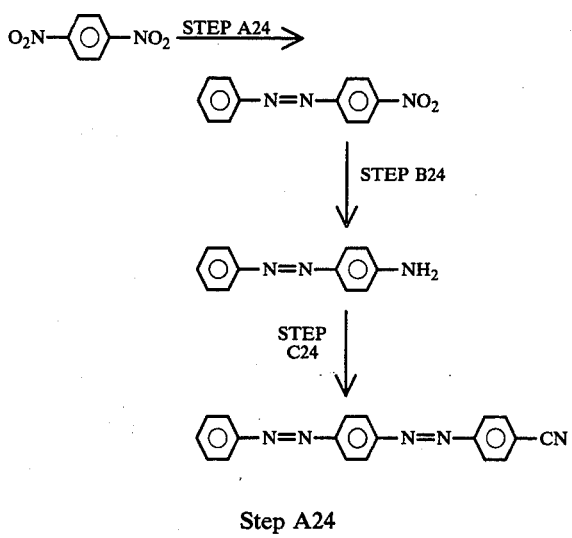

Step A24

This step is carried out in a manner analogous to Step B22 using aniline and 4-nitrosonitrobenzene. The 4-nitroazobezene may be used as a dye itself or as a starting material for Step B24.

Step B24

The 4-nitroazobenzene is reduced to 4-aminoazobenzene in a manner analogous to Step A22.

Step C24

This condensation is carried out in a manner analogous to Step A22 using the product from Step B24 and 4-cyanonitrosobenzene.

Example 25

The production of dyes as defined above where $n_3 = 2$ and $Y$ = hydrogen, by the following route:

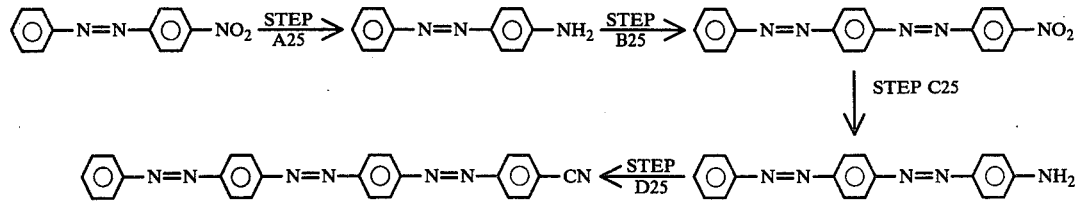

Step A25

This step is carried out in a manner analogous to Step A12.

Step B25

This step is carried out in a manner analogous to Step A13.

Step C25

This step is carried out in a manner analogous to Step A12.

Step D25

This step is carried out in a manner analogous to Step C13.

It will be apparent to those versed in the art and science of organic chemistry that dyes of formula III and IV as defined above and which are derivatives of the compounds prepared by Examples 20 to 25 may be prepared by suitable reduction, diazotisation and condensation steps analogous to those described in the Examples. For example additional substituents, such as halogen, simple alkyl, simple substituted alkyl, simple alkoxy, or bridging groups such as a fused aromatic ring may be introduced in this way.

EXAMPLE 26

The preparation of a dye of formula (V) defined above by the following route:

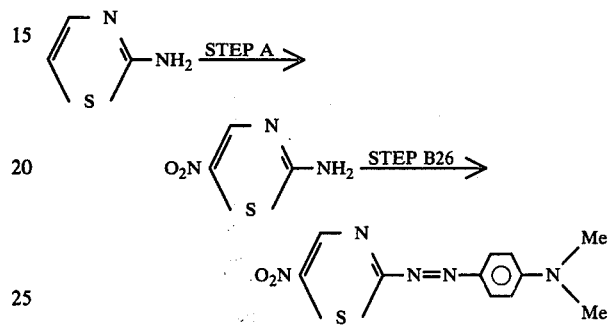

Step A26

Production of 2-amino-5-nitrothiazole

This is prepared by a standard method (J Org Chem, 1955, 20, page 499) from 2-aminothiazole.

Step B26

Production of the 5-nitro-2-thiazolylazo dye

2-Amino-5-nitrothiazole (2 g. 0.014 mol) is diazotised by dissolving it in a small volume of concentrated sulphuric acid at 0°–5° C. Nitrosyl sulphuric acid (0.14 mol) (prepared by standard methods) is added and the reaction mixture is stirred for 10 minutes. Glacial acetic acid (10 ml) is slowly added with stirring and a few grams of ice are added and a drop of the mixture is tested with N, N-dimethylaniline to determine whether coupling (a red colouration) is taking place; if it is not, more ice is added and the test repeated until coupling does occur. Then, a solution of N,N-dialkylaniline (0.14 mol) in glacial acetic acid is added to the bulk reaction mixture which is stirred for 2 hours, the pH being adjusted to pH 5 to 6 with sodium acetate. The pH is then adjusted to pH 7 with sodium hydroxide and the solid dye is filtered, washed and dried. Column chromatography on aluminium oxide with dichloromethane as eluent is used to purify the dye.

Specific examples of dyes as defined above are as follows:

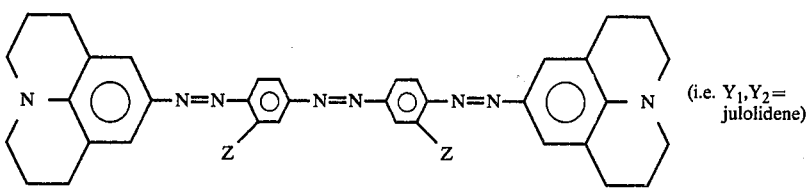 (i) (i.e. $Y_1, Y_2$ = julolidene)

where Z is either a substituent, eg Me or halogen, or H. For instance where Z is Cl this dye is blue and shows an order parameter of 0.64 in a 5-component liquid crystal mixture having a nematic to isotropic transition temperature of 70° C.

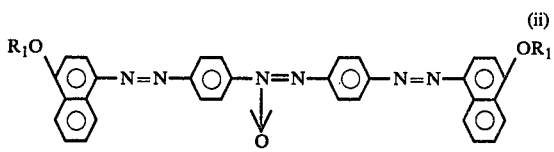 (ii)

For instance, when $R_1$ is $C_7H_{15}$ the dye is red and shows an order parameter of 0.74 at room temperature in a 4-component liquid crystal mixture having a nematic-to-isotropic transition temperature of 95° C.

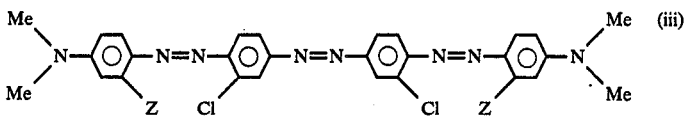 (iii)

where Z is either a substituent or hydrogen. For instance, when Z is $CH_3$ the dye is purple and shows an order parameter of 0.66 at room temperature in a 4-component liquid crystal mixture having a nematic-to-isotropic transition temperature of 55° C. When Z is H the dye is purple and shows an order parameter of 0.75 at room temperature in a 4-component liquid crystal mixture having a nematic-to-isotropic transition temperature of 82° C.

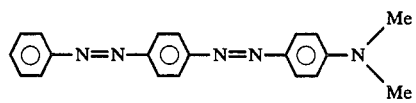 (iv)

where Me = methyl. This dye has an order parameter of 0.75 in a 5-component nematic cyanobiphenyl/terphenyl mixture having a nematic-to-isotropic transition temperature of 70° C. This dye is orange/red and has a peak wavelength absorbance at 505nm.

(v) the dye

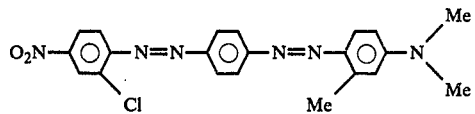

is purple and shows an order parameter of 0.65 at room temperature in a 4-component liquid crystal mixture having a nematic-to-isotropic liquid transition temperature of 55° C. This dye shows a reasonable chemical stability when used in solution with liquid crystal material.

(vi) the dye

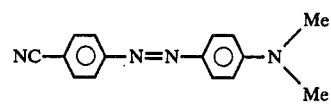

is orange and shows an order parameter of 0.60 in a 4-component liquid crystal material having a nematic-to-isotropic transition at 55° C.

(vii) the dye

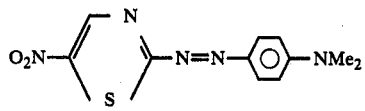

shows an order parameter of 0.70 in the liquid crystal material E8 manufactured by BDH Chemicals Ltd (a five component liquid crystal mixture which has a nematic-to-isotropic transition at 70° C) and a maximum absorbance at a wavelength of 594 nm making it appear blue.

Figure 2:
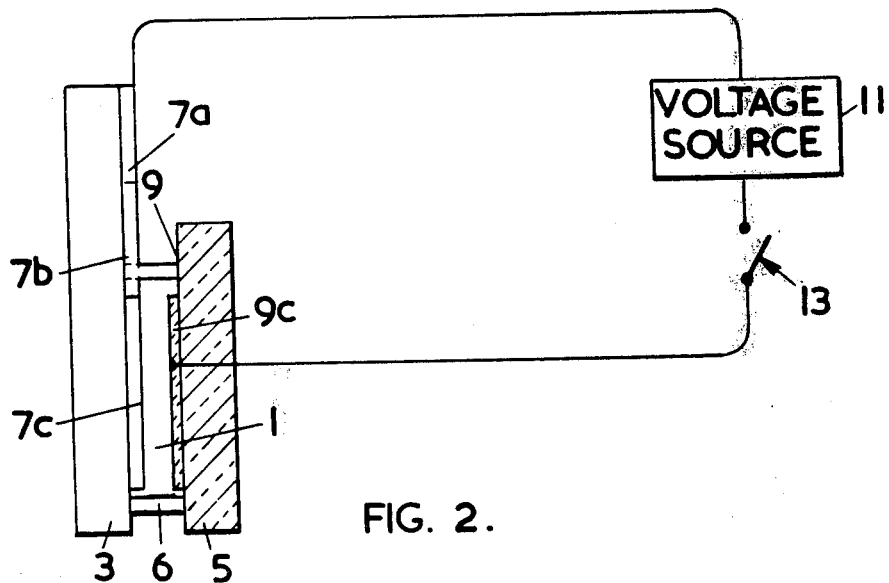

An example of the preparation and construction of a device which is both a cholesteric-to-nematic phase-change and a 'guest-host' liquid crystal device will now be described with reference to the accompanying drawings, in which FIG. 1 is a front view of the device;

FIG. 2 is a cross-sectional view, partly cut away for clarity, of the device on the line II—II of FIG. 1.

A suitable cholesteric liquid crystal mixture is produced by adding the constituent compounds of the following mixture together in a small beaker.

| | |
|---|---|
| 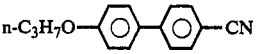 | 14% by weight |
| 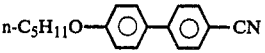 | 36% by weight |
| 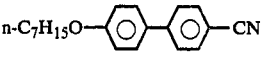 | 36% by weight |
| 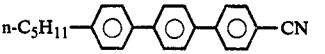 | 9% by weight |
| Cholesteryl nonanoate | 5% by weight |

A small amount (about 1 to 2% by weight) of at least one of the dyes as defined above is added to the liquid crystal mixture. The beaker and its contents are heated above the temperature at which the liquid crystal mixture is a clear, isotropic liquid, about 82° C, and are maintained at the temperature for several minutes. The contents are thoroughly stirred whilst the temperature is being raised and during the period when the temperature is maintained.

After this period the constituent compounds in the beaker will have dissolved into one another. The beaker and its contents are then allowed to cool. The resultant solution is then introduced into a liquid crystal cell in a known way, eg by capillary action.

FIGS. 1 and 2 show the cell construction. The cell comprises a layer 1 of the solution of dyed liquid crystal material sandwiched between two parallel rectangular glass slides 3 and 5 having their respective longer edges perpendicular to one another and held apart by a ring-shaped spacer 6 (cut away for clarity in FIG. 2) defining the lateral extremities of the layer 1. The slides 3 and 5 both have on their respective inner surfaces electrodes 7 and 9. The electrode 7 is in the form of a patch 7a on an area of the slide 3 which does not face the slide 5, a strip 7b leading from the patch 7a and a portion 7c attached to the strip 7b and in the form of a letter A. The electrode 9 is in the form of a patch 9a on an area of the slide 5 which does not face the slide 3, a strip 9b leading from the patch 9a and a portion 9c attached to the strip 9b and which is in the form of the letter A. The portion 7c and the portion 9c are arranged to be identical and to face one another.

A voltage source 11 and a switch 13 in series with it are connected between the patch 7a and the patch 9a. The source 11 provides a voltage, which may be either direct or alternating with a low frequency, sufficient to cause re-orientation of liquid crystal and dye molecules in the layer 1 to lie generally in the plane of the slides 3 and 5. A voltage of 10 - 20 volts will typically be required.

When the switch 13 is open the applied voltage is zero and the liquid crystal and dye molecules are arranged in an array of random helices owing to the cholesteric nature of the liquid crystal material. The layer 1 thus appears strongly coloured with the colour of the dye, eg purple for the specific dye mentioned above, since white light incident on the layer 1 has a colour component absorbed by many of the dye molecules particularly those which are perpendicular or oblique to the propagation direction of the light.

When the switch 13 is closed the electric field produced by the voltage source 11 causes the cholesteric to nematic phase change effect to occur. The liquid crystal molecules in the region between the portions 7c and 9c are re-orientated to lie perpendicular to the slides 3 and 5, ie parallel to the electric field, and the dye molecules in this region are re-orientated with the liquid crystal molecules. The layer 1 then appears clear or only weakly coloured between the portions 7c and 9c since the dye molecules do not significantly absorb light propagating along the direction of the electric field, ie along the long axis of the dye molecules. The remainder of the cell appears strongly coloured. If the electric field is removed the dye and liquid crystal molecules all return to their original helical arrangement.

Therefore the letter A may be displayed or not displayed by opening and closing the switch 13.

Preferably, the cell includes a reflector such as a white diffuse reflector, eg white card, a mirror, or a cardboard or plastic screen sprayed with aluminum paint, located behind the slide 5. If the device is then observed from in front of the slide 5 the reflector provides a more uniform background to the letter A.

Other letters, symbols or numerals or groups of them may be displayed in a similar way.

We claim:

1. A liquid crystal electro-optic device comprising two dielectric substrates at least one of which is optically transparent, at least one electrode on the inner surface of each substrate, and a layer of material sandwiched between the substrates, characterized in that said material is a liquid crystal twist-type nematic or cholesteric-to-nematic system which comprises a mixture of compounds each having a generalized formula

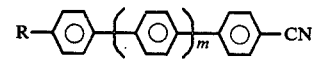

wherein R is an alkyl or alkoxy group and m = 0 or 1, at least one of said compounds being cyanobiphenyl wherein m = 0, said material including in solution a dye having a formula selected from one of the following:

(I)

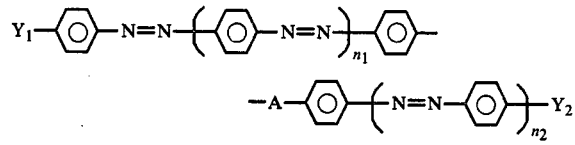

(II) a derivative of formula (I) wherein any of the lateral positions on any one of the benzene rings is substituted by one of the following substituents
  (i) a halogen atom
  (ii) a methyl group
  (iii) a halogen-substituted methyl group
  (iv) a methoxy group;

(III) a derivative of formula (I) wherein any two of the lateral positions on any one of the benzene rings is bridged by a fused aromatic ring forming a naphthalene structure;

wherein
  A is an azo or azoxy linkage group
  $n_1$ and $n_2$ are integers in the inclusive range 0 to 4 and $Y_1$ and $Y_2$ are each one of the following
    (i) hydrogen
    (ii) $OR_1$ where $R_1$ is an alkyl or arylalkyl group
    (iii)

wherein $R_2$ and $R_3$ are each one of the following:
      a simple alkyl or substituted alkyl group or an alkylene group forming a reduced heteroaromatic system with the terminal aromatic ring.

2. A liquid crystal electro optical device as claimed in claim 1 wherein the solution contains a dye having the formula

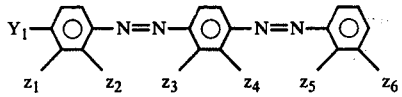

wherein $Y_1$ is as defined in claim 1 and $z_1$, $z_2$, $z_3$, $z_4$, $z_5$, $z_6$ are each one of the following: hydrogen, chlorine or methyl.

3. A liquid crystal electro optical device as claimed in claim 1 wherein the solution contains a dye having the formula

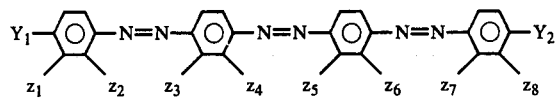

wherein $Y_1$, $Y_2$ and A are as defined in claim 1, and $z_1$, $z_2$, $z_3$, $z_4$, $z_5$, $z_6$, $z_7$ and $z_8$ are each one of the following: hydrogen, methyl or chlorine.

4. A liquid crystal electro optical device as claimed in claim 1 wherein the solution contains a dye having the formula

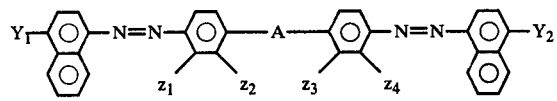

where $Y_1$, $Y_2$ and A are as claimed in claim 1 and where $z_1$, $z_2$, $z_3$ and $z_4$ are each one of the following: hydrogen, methyl or chlorine.

5. A liquid crystal electro optical device as claimed in claim 1 wherein the solution contains a dye having the formula

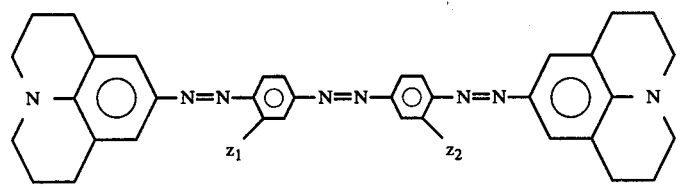

where $z_1$ is the same as $z_2$ and is one of the following: hydrogen, methyl or chlorine.

6. A liquid crystal electro optical device as claimed in claim 1 wherein the solution contains a dye having the formula

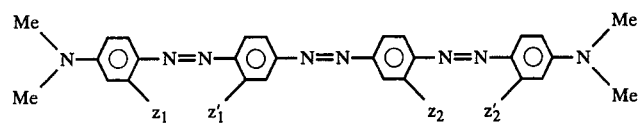

where $z_1$, $z_1'$ is the same as $z_2$, $z_2'$ and is one of the following: hydrogen, methyl or chlorine.

7. A liquid crystal electro optical device as claimed in claim 4 wherein the solution contains a dye having the formula

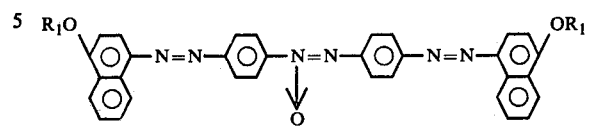

wherein $R_1$ is $C_7H_{15}$.

8. A liquid crystal electro optical device as claimed in claim 1 wherein the solution contains a dye having the formula

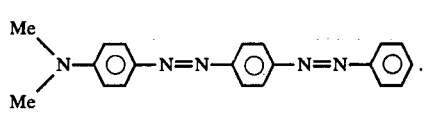

9. A liquid crystal electro-optic device as claimed in claim 1 and which is a cholesteric to nematic phase change device.

10. A liquid crystal electro-optic device as claimed in claim 1 and which is a twist-type nematic device.

11. A liquid crystal electro-optic device comprising two dielectric substrates at least one of which is optically transparent, at least one electrode on the inner surface of each substrate, and a layer of material sandwiched between the substrates, characterized in that said material is a liquid crystal twist-type nematic or cholesteric-to-nematic system which comprises a mixture of compounds each having the formula

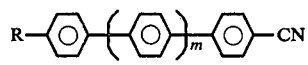

wherein R is an alkyl or alkoxy group and m = 0 or 1, at least one of said compounds being a cyanobiphenyl wherein m = 0, said material including in solution a dye having a formula selected from one of the following:

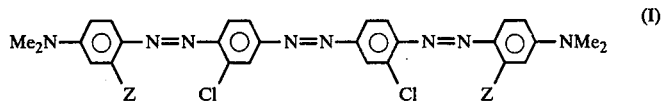

(I)

where Z is a hydrogen, methyl, or chlorine;

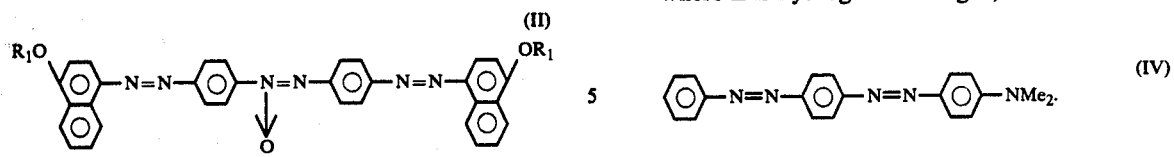
where R is an alkyl group, particularly $C_7H_{15}$;
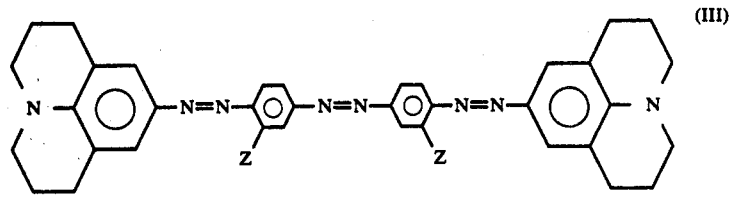
where Z is hydrogen or halogen; and
$$\text{(IV)}$$
* * * * *